(No Model.)
H. WRIGHT.
CLOTHES WASHER.
No. 336,369. Patented Feb. 16, 1886.
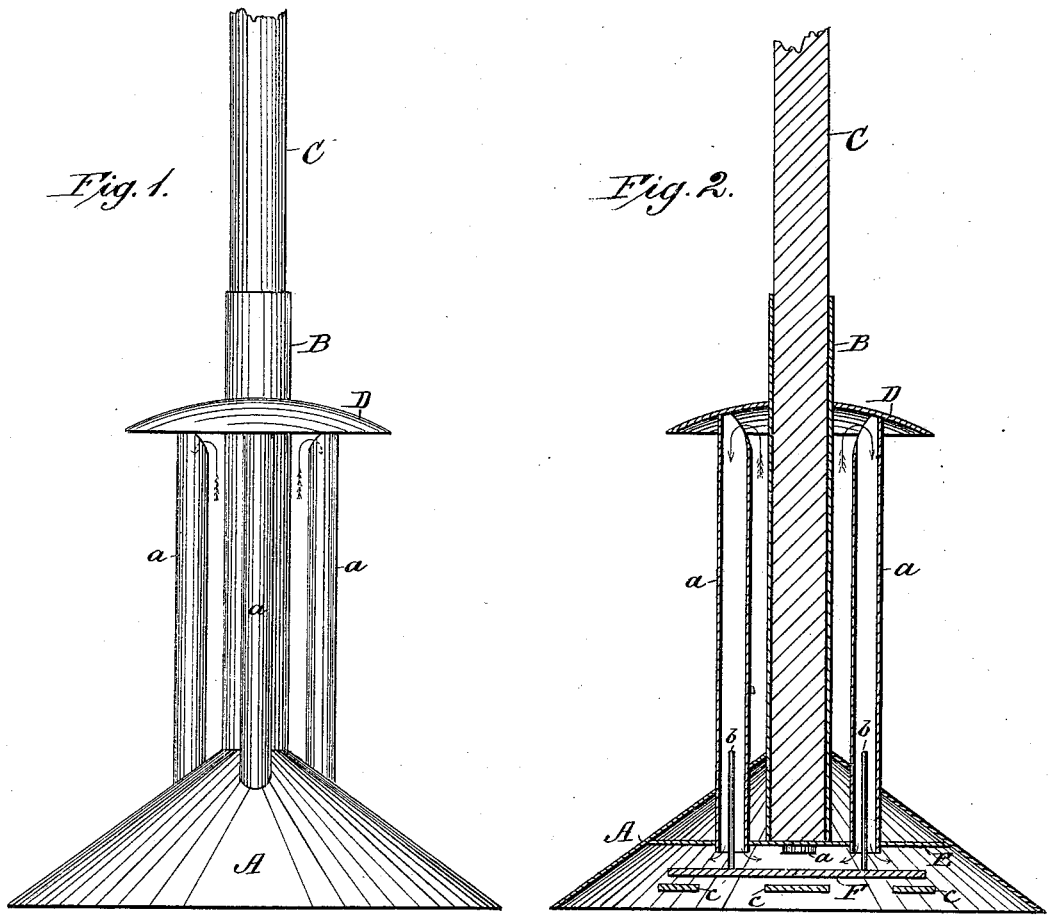
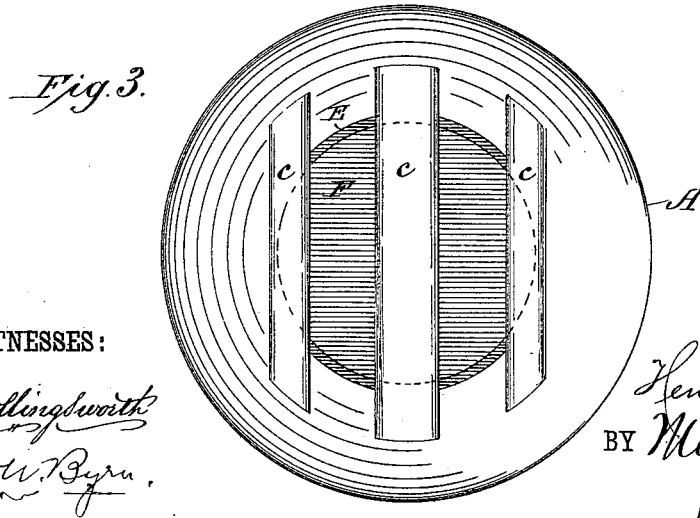
WITNESSES:
W. W. Hollingsworth
Edw. W. Byrn
INVENTOR:
Henry Wright
BY Munn & Co
ATTORNEYS.

UNITED STATES PATENT OFFICE.

HENRY WRIGHT, OF SIGOURNEY, IOWA.

CLOTHES-WASHER.

SPECIFICATION forming part of Letters Patent No. 336,369, dated February 16, 1886.

Application filed February 24, 1885. Serial No. 156,920. (No model.)

*To all whom it may concern:*

Be it known that I, HENRY WRIGHT, a citizen of the United States, residing at Sigourney, in the county of Keokuk and State of Iowa, have invented certain new and useful Improvements in Clothes-Washers, of which the following is a description.

Figure 1 is a side elevation. Fig. 2 is a vertical central section, and Fig. 3 is an inverted plan view.

My invention relates to clothes-washers of that class in which a straight handle is provided with a funnel-shaped plunger at its lower end, and a valve which shuts off the air when the plunger is forced down and opens and admits air to the funnel-shaped plunger when the latter is raised, the same being designed for use by reciprocating it vertically in a wash-tub containing the clothes and soap-suds.

My invention consists in the peculiar construction and arrangement of parts operating on the above general principle, which I will now proceed to fully describe, and particularly point out in the claims.

In the drawings, A represents the funnel-shaped plunger, from the center of which rises the tube B, which forms the socket for containing the handle C. Around this tube, and parallel with it, are arranged four smaller tubes, $a\ a\ a\ a$, which are at the top connected to and braced by an overlapping cap-piece, D, firmly secured to the central tube, and said tubes at their bottoms protrude through the funnel, and are attached to and open through a crown-sheet, E, fixed in the top of the funnel. Just beneath this crown-sheet is arranged a flat and circular or disk-shaped valve, F, which is guided in its movement by stems $b$, extending up into the small air-tubes $a$, and is retained in place by cross bars $c\ c\ c$, extending across the lower portion of the funnel. This valve F is designed to play over and alternately open and close the lower ends of the tubes $a$ where they open through the crown-sheet E.

The air-tubes $a$ are open at their upper ends, where they join the cap-piece D, and when the plunger is raised the valve F drops down, opening the lower ends of the tubes $a$, and allowing air to pass down to the funnel, so that no sucking action takes place, and but little power is required to raise the plunger out of the water. On the downstroke, however, the valve F closes over the open ends of the tubes $a$, and the air within the funnel is forcibly expelled through the water, forcing the water and suds through the clothes in a current toward the bottom, dislodging the dirt and thoroughly and quickly cleansing the clothes.

Having thus described my invention, what I claim as new is—

1. The combination, with a funnel-shaped plunger having a central tubular socket for the handle, of the parallel side tubes, $a$, open at their upper ends and connected to the central tube by an overhanging cap, and opening into the funnel below, and the valve F and retaining-bars $c$, the said valve being arranged between the lower ends of the tubes and retaining bars, and having guide-stems extending up into the tube, as and for the purpose described.

2. The combination, with a funnel-shaped plunger having a central tubular socket for the handle, and a crown-sheet, E, of the parallel side tubes, $a$, open at their upper ends and connected to the central tube by an overhanging cap, and opening into the funnel below the crown-sheet, and the valve F and retaining-bars $c$, the said valve being arranged between the lower ends of the tubes and retaining-bars, and having guide-stems extending up into the tubes, as and for the purpose described.

HENRY WRIGHT.

Witnesses:
ALFRED J. PARKE,
SAMUEL R. WRIGHT.